United States Patent [19]

Tetart et al.

[11] Patent Number: 5,270,434
[45] Date of Patent: Dec. 14, 1993

[54] PHENOLIC RESIN, PROCEDURE FOR PREPARATION OF THE RESIN, AND SIZING COMPOSITION FOR MINERAL FIBERS CONTAINING THIS RESIN

[75] Inventors: M. Serge Tetart, Saint-Maximin, France; M. David Segal, Hatfield, Penn.

[73] Assignee: Isover Saint-Gobain, Courbevoie, France

[21] Appl. No.: 970,247

[22] Filed: Nov. 2, 1992

Related U.S. Application Data

[63] Continuation of Ser. No. 775,759, Oct. 15, 1991, abandoned.

[30] Foreign Application Priority Data

Oct. 12, 1990 [FR] France ................... 90 12604

[51] Int. Cl.$^5$ ............................................. C08G 14/08
[52] U.S. Cl. ........................................ 528/164; 524/575; 524/596; 525/504; 528/162; 427/389.8; 427/421; 428/361; 428/375
[58] Field of Search ................ 528/162, 164; 524/595, 524/596, 575; 428/375, 392, 361; 525/504; 427/389.8, 421

[56] References Cited

U.S. PATENT DOCUMENTS

| | | | |
|---|---|---|---|
| 3,616,179 | 10/1971 | McCombs | 528/164 |
| 3,616,181 | 10/1971 | Stalego | 528/164 |
| 3,843,575 | 10/1974 | Dijkstra | 260/53 |
| 3,876,405 | 4/1975 | Eilerman | 524/511 |
| 4,663,419 | 5/1987 | Fugier et al. | 427/389.8 |
| 4,710,406 | 12/1987 | Fugier et al. | 526/164 |

FOREIGN PATENT DOCUMENTS 364304 1/1932 United Kingdom.

OTHER PUBLICATIONS

Patent Abstracts of Japan, vol. 9, No. 112 (C-281) [1835], 16 mai 1985; & JP-A-60 006 716 (Toshiba Chemical) 14-01-1985*.
Phenolic Resin for Laminated Sheet, vol. 9, No. 112 (C-281) (1 Sheet).

*Primary Examiner*—John Kight, III
*Assistant Examiner*—Richard Jones
*Attorney, Agent, or Firm*—Oblon, Spivak, McClelland, Maier & Neustadt

[57] ABSTRACT

The invention concerns a phenolic resin.

The resin is a liquid, contains phenol-formaldehyde, formaldehyde-urea and phenol-formaldehyde-amine condensates, and has a free formaldehyde content of less than 3%, this proportion being expressed as a percentage of the total fluid weight, and a dilutability rate in water which equals or surpasses 1,000%. Furthermore, the resin is stable when heated. Application to less-polluting sizing compositions for mineral fibers; and use of the fibers thus sized for the manufacture of insulating products and soilless cultivation substrates.

19 Claims, No Drawings

PHENOLIC RESIN, PROCEDURE FOR PREPARATION OF THE RESIN, AND SIZING COMPOSITION FOR MINERAL FIBERS CONTAINING THIS RESIN

This application is a continuation of application Ser. No. 07/775,759, filed on Oct. 15, 1991, now abandoned.

BACKGROUND OF THE INVENTION

1. Field of the Invention

The present invention relates to a phenolic resin, designed to be used in a sizing composition for mineral fibers. This resin is produced from the condensation of phenol, formaldehyde, amine, and urea.

The present invention also relates to a procedure for the preparation of a phenolic resin and for a sizing composition that contains said resin for bonding mineral fibers.

The present invention further relates to the use of sized mineral fibers for the manufacture of insulating products and for products designed to form soilless cultivation substrates.

2. Discussion of the Background

Mineral fiber-based products may be produced from fibers obtained using various procedures. Mention may be made of the conventional centrifugal stretching technique, in which molten material, which is placed in a centrifuge containing a multitude of small holes, is thrown against the peripheral centrifuge wall by centrifugal force, and escapes through the holes in filament form. Upon exiting from the centrifuge, these filaments are stretched and driven to a collection apparatus by a high-speed, high-temperature gas current, so as to form a layer of fibers. To bond the fibers together, a composition, called a sizing composition, containing a thermosetting resin, is sprayed on the fibers as they travel to the receiving device. The layer of fibers treated in this manner is then subjected to a thermal treatment in an oven, in order to polycondense the resin and obtain an insulating product exhibiting the desired properties, such as dimensional stability, resistance to traction, retention of thickness after compression, and homogeneous color.

The sizing compositions, to be sprayed on the mineral fibers, contain a resin which is generally an aqueous compound further containing urea and additives such as silane, mineral oils, liquid ammonia, ammonium sulfate, and water.

In accordance with the invention, resin is defined as a product of condensation of reactive starting materials in the presence of a catalyst, prior to any baking phase in an oven.

The properties sought for the sizing compositions are dependent to a large extent on the properties of the resin. A sizing composition must, above all, possess a high spraying capacity, coating and fiber-bonding properties, and must, at the same time, not pollute to any significant degree.

To possess these properties, the resin must, in particular, exhibit good stability over time and be highly dilutable in water.

The resin must be stable, especially for at least eight days at 12°–18° C. Indeed, it must be possible to preserve it for several days before using it to make the sizing composition. The sizing composition containing the aforementioned resin and additives, is normally prepared at the time of use.

The resin must, moreover, possess a high degree of dilutability in water. Dilutability is a particularly important factor, since the sizing composition containing the resin is then suitable for spraying. Dilutability is generally defined as follows: dilutability in water of a resin in the form of an aqueous compound is the volume of deionized water which, at a given temperature, can be added to the unit of volume of that compound before causing formation of permanent turbidity.

The dilutability in water of a resin capable of being used in a sprayable sizing composition must preferably be equal to or greater than 1,000% for at least eight days at 20° C.

Furthermore, the resin must be as free as possible from unreacted starting materials. The risks of atmospheric pollution results basically from the presence of volatile monomers: these include the starting materials needed to produce the resin, i.e., formaldehyde and phenol which remain unreacted during the reaction or are reformed during sizing of the fibers or at a later stage.

Accordingly, to obtain sizing compositions in which the pollution-generating-agent content, and most notably the free phenol and free formaldehyde content, is as low as possible, the resin must contain the smallest possible quantity of unreacted starting materials, while at the same time preserving its properties.

These two objectives, i.e., a stable resin containing small quantities of free formaldehyde and phenol which, at the same time, preserves the desired properties, in particular a high degree of dilutability in water facilitating spraying on the mineral fibers, are mutually contradictory. Reduction of the free phenol and formaldehyde contents is generally obtained by increasing the condensation rate (i.e., % conversion of phenol and formaldehyde), however this has the consequence of, reducing dilutability.

Conventional practice calls for the preparation of resins that can be used for mineral-fiber sizing compositions by reacting phenol and formaldehyde in the presence of an alkaline catalyst. To promote the phenol-formaldehyde reaction and to thus reduce the quantity of non-reacted phenol and avoid pollution risks, conventional practice prescribes the use of a formaldehyde/phenol mol ratio greater than 1, and, to react the excess formaldehyde, by the addition of urea. Resins formed from condensates of formaldehyde-phenol and urea-formaldehyde are thus formed.

Accordingly, as described in U.S. Pat. Nos. 4,663,419 and 4,710,406, it has proved possible to obtain a resin in liquid form resulting from the condensation, in an alkaline medium, of formaldehyde, phenol, and urea, possessing a dilutability in water of at least 1,000%, and containing a free phenol and a free formaldehyde content of less than or equal to 0.5% and 3%, respectively, of the total weight of the liquid. This resin thus obtained has a formaldehyde/phenol mol ratio of between 3 and 6. The proportion of phenol and formaldehyde is measured as a percentage of the total fluid weight.

This resin is considered to have satisfactory properties permitting its use in sizing compositions for mineral fibers and to be relatively non-polluting.

While the free phenol content can be considered fairly low and to cause little pollution, the free formaldehyde content in the resin (3%) is still high. Attempts have thus been made to reduce it still further, while preserving the resin properties for the ultimate use desired.

Furthermore, the use of a high formaldehyde/phenol mol ratio, as described in the above-mentioned U.S. Pat. Nos. 4,663,419 and 4,710,406, makes it possible to substantially reduce the free phenol content; however, it requires the use of urea to react with the excess formaldehyde. The result is the formation of a urea-formaldehyde condensation product which is not particularly stable when heated.

The thermal instability of urea-formaldehyde and condensation products constitutes a problem, since the mineral fibers treated by the sizing composition are subjected to a thermal treatment so as to obtain a product used for insulation.

In fact, when the resin is used for sizing mineral fibers, the resin is exposed to temperatures of more than 100° C., and the urea-formaldehyde condensation product releases formaldehyde under the effect of heat, thereby increasing atmospheric pollution. A need therefore continues to exist for a sizing composition with reduced emissions.

SUMMARY OF THE INVENTION

The object of the present invention is to provide a new resin exhibiting satisfactory properties provide for use in a sprayable sizing composition and which has low emissions, especially with regard to formaldehyde; i.e., a resin which contains a small proportion of free formaldehyde and which, furthermore, is thermally stable, so as to prevent the reformation of formaldehyde during use of the resin.

Another object of the present invention is a process for the preparation of the resin, in particular a process which makes it possible to use a smaller formaldehyde/phenol mol ratio, so as to reduce the quantity of urea necessary for the reaction with the excess formaldehyde and the product of this process.

A further object of the present invention is a sizing composition containing this resin, a process for sizing mineral fibers, and a composition of mineral fibers sized with a liquid resin.

DETAILED DESCRIPTION OF THE PREFERRED EMBODIMENTS

The liquid resin according to the invention, which is intended to be used in a sizing composition for mineral fibers, basically contains condensates of phenol-formaldehyde (P-F), urea-formaldehyde (U-F), and phenol-formaldehyde-amine (P-F-A). This resin has a free formaldehyde (FL) content of less than or equal to 3% of the total weight of the liquid. It also has a dilutability in water of at least 1,000%, measured at 20° C. In addition, the resin is thermally stable, i.e., the resin contains little or no methylol urea, which is relatively unstable.

To assess thermal stability, a sizing composition containing the resin is subjected to a test simulating the thermal conditions to which a sizing composition is exposed to during the manufacture of an insulating product, as previously described. The resin is considered to be thermally stable and to generate little formaldehyde pollution if the quantity of formaldehyde released during this test is less than 4 g of formaldehyde per kilogram of dry matter of a 10% sizing composition. Thermal stability may also be demonstrated using thermal gravimetric analysis.

The amine (A) is chosen from among those allowing a Mannich-type reaction. Suitable amines are primary and second amines containing at least one reactive hydrogen including ammonia. A group including, for example, lower $C_{1-6}$ alkanolamines such as monoethanolamine (MEA), diethanolamine (DEA), and $C_{5-8}$ cyclic amines such as piperidine, piperazine and morpholine are preferred.

According to the present invention, the reaction of excess free formaldehyde with the urea is preceded by reacting the free formaldehyde and the free phenol with an amine.

The reaction according to the present invention is a Mannich-type reaction, which generally transforms an aldehyde, an organic compound containing active hydrogen atoms, and an amine into a Mannich base by means of condensation. In this instance, the aldehyde is formaldehyde and the organic compound is phenol. The amine may be selected, for example, from among those mentioned above. In the invention, the amine reacts with the phenol or the methylol phenols and the formaldehyde, thereby giving the resin a much more stable structure.

To obtain a resin such as the resin previously specified, the invention proposes a process which consists in reacting phenol and formaldehyde in a mol ratio greater than 1 in the presence of an alkali catalyst, in cooling the reaction mixture, and reacting the excess formaldehyde with urea. The invention is characterized by the fact that, before adding urea and during the cooling phase, an amine suitable for the Mannich reaction is added to the reaction mixture.

More specifically, the phenol and the formaldehyde in a mol ratio of between 1.8 and 5 are reacted, until a phenol conversion rate equal to or greater than 93% is obtained. Cooling of the reaction mixture is then started.

The phenol conversion rate is the proportion of phenol which has taken part in the formaldehyde-phenol condensation reaction, as a percentage of the total original phenol. The formaldehyde-phenol condensation reaction is halted, by cooling of the reaction mixture, at a stage corresponding to a resin that can still be diluted in water.

According to the present invention, the amine (A) is added before adding urea, either during cooling of the reaction mixture or after it has cooled. The amine is added progressively, since the reaction of the amine with the formaldehyde and the phenol is exothermic. The addition of the amine can take place at the beginning of the cooling of the reaction mixture, or when the mixture has been cooled to a temperature of between 45° and 20° C.

The reaction of the phenol, the formaldehyde, the methylol phenols, and the amine according to the invention makes it possible to reduce the quantity of free formaldehyde in the reaction medium before the addition of urea and, consequently, to obtain a resin comprising a urea-formol condensate in a smaller quantity. The result is, therefore, greater thermal stability of the resin. The reaction of the free formaldehyde with the amine and then with the urea makes it possible to lower still further the quantity of free formaldehyde in the final resin, and even to obtain a percentage of free formaldehyde in the resin which is less than 0.75%, and even less than 0.5%.

Furthermore, the addition of an amine according to the invention allows the further reduction of the proportion of free phenol, especially for resins prepared using a high F/P mol ratio.

In fact, in a conventional procedure for the preparation of a phenolic resin, such as the resin described in Patent No. EP-A-148 050, the condensation reaction of the phenol and the formaldehyde (using an F/P mol ratio of between 3 and 6) occurs until a conversion rate of more than 98% is obtained. During the following stages of the preparation procedure, the quantity of unreacted phenol does not vary.

The addition of an amine, according to the present invention, after the condensation reaction of the phenol and the formaldehyde makes it possible to fix the unreacted phenol, thereby reducing the quantity of free phenol. It thus becomes possible to achieve free phenol percentages of less than 0.2%.

The use of an amine in accordance with the invention has the further advantage of allowing the reaction of the phenol and the formaldehyde in an F/P mol ratio of less than 3, while obtaining a resin which has the desired water-dilutability and non-pollution properties. In fact, when the F/P mol ratio is lowered, the free formaldehyde in the resin diminishes, but the free phenol increases. The addition of amine, according to the invention, allows the production, using low F/P mol ratio, of resins containing free phenol percentages that could previously be obtained only by using high mol ratios.

More specifically, resin preparation follows a temperature cycle that is schematically divided into three phases: a heating phase, a steady temperature level, and a cooling phase.

According to this procedure, during a first stage, phenol and formaldehyde are reacted in the presence of a basic catalyst, by gradually heating to a temperature of between 60° C. and 75° C., and preferably to approximately 70° C. As indicated above, the F/P mol ratio ranges between 1.8 and 5.

As a catalyst, various basic catalysts can be used, such as triethylamine, calcium oxide (lime) and hydroxides of alkali or alkaline-earth metals, such as sodium, potassium, calcium, and barium hydroxides.

Whichever catalyst is chosen, the quantity used advantageously ranges from 6 to 20 mole equivalents of hydroxyl OH⁻ for 100 moles of original phenol.

During the second phase (steady temperature level), the reaction temperature, which is reached during the heating phase, i.e., a temperature of between 60° C. and 75° C. and preferably 70° C., is maintained until a phenol conversion rate of at least 93% is achieved. This temperature-maintenance phase preferably lasts a maximum of approximately 90 min.

The third phase is a cooling phase during which, in accordance with the invention, amine is added to the reaction medium so as to trigger the Mannich reaction, thus producing the phenol-formaldehyde-amine condensate.

The amine can be added when cooling of the reaction mixture first begins. The amine is added gradually, for example at the rate of 0.33% by weight per minute of the total quantity of amine in relation to the weight of the resin.

The amine can also be added at the end of the cooling phase, for example at a temperature of between 20° C. and 45° C.

The amine addition-time can range between 20 min and 45 min.

The quantity of the added amine, in particular alkanolamine, is between 5 and 40% of the weight of the phenol.

After the formation of the phenol-formaldehyde-amine condensate, the reaction mixture is cooled, if necessary, so that the temperature reaches approximately 20°–25° C., and the mixture is neutralized in order to stop the condensation reactions.

In general, the reaction mixture is neutralized by adding an acid, such as sulfuric, sulfamic, phosphoric, or boric acid, in a quantity sufficient to ensure that the pH of the mixture ranges between approximately 7.0 and 8.5. After neutralization, urea is added to fixed the unreacted formaldehyde.

According to the invention, the urea is added to the already cooled reaction mixture, i.e., when the temperature of the reaction mixture has reached approximately 20°–25° C. The quantity of the added urea varies between 10% and 50% of the weight of the resin expressed as dry matter.

The addition of the urea to the cooled reaction mixture during resin preparation is advantageous, since when the cold reaction between the formaldehyde and the urea occurs slowly, thereby making it possible to control the reaction and to prevent excessively-advanced condensation leading to a reduction of the dilutability of the final resin.

According to another variant of the procedure according to the invention, liquid ammonia can be added to the reaction mixture either before or after neutralization, in order to collect a portion of the free formaldehyde. Hexamethylenetetramine is thereby formed.

The liquid ammonia is added as an aqueous solution in a quantity of between 0 and 100% of the stoichiometry of the formaldehyde-liquid ammonia reaction, the quantity of the formaldehyde being calculated based on the concentrations present at the time the liquid ammonia is added.

The invention further concerns a sizing composition designed for coating mineral fibers, especially glass or rock fibers, as well as the sized fibers obtained, which can be used for the manufacture of insulating products or soilless cultivation substrates.

A sizing composition according to the invention comprises the resin according to the invention, bonding additives, and urea.

As previously indicated, one characteristic of the resin according to the invention may be that it has a very low free formaldehyde percentage, i.e. less than 2% and advantageously less than 0.75%. In this case, the presence of urea in the sizing composition is no longer necessary, or it is needed only to adjust the gel time of the sizing procedure, in order to prevent potential pre-gelling problems.

In the sizing compositions according to the invention which contain urea, the proportions of the constituents are, 50–90 parts resin and 10–50 parts urea per part of dry matter.

In general, a typical sizing composition contain the following additives for 100 parts of dry resin and urea material:

0–5 parts ammonium sulfate, and generally from 1 to 3 parts;

0–2 parts silane, in particular an aminosilane;

0–20 parts oil, generally from 6 to 15;

0–20 parts 20% liquid ammonia, normally from 3 to 12.

The function of these ingredients is well-known and is only briefly recapitulated here. The ammonium sulfate acts as a polycondensation catalyst (in the oven under heat) after spraying the sizing composition on the fibers. The silane is a coupling agent between the fibers and the resin, and also serves as an anti-aging agent. The oils are dust-prevention and hydrophobic agents. When cold, the liquid ammonia has a polycondensation-retarding function and, in addition, fixes the free formaldehyde. The urea modifies the compound in order to influence the pre-gelling of the sizing composition and reduce pollution.

A silane which can advantageously be used is aminosilane, marketed by the Union Carbide company under the name "A1100." Use may also be made of a mineral oil marketed by Mobil Oil under the tradename "MULREX 88."

Having generally described this invention, a further understanding can be obtained by reference to certain specific examples which are provided herein for purposes of illustration only and are not intended to be limiting unless otherwise specified.

The following examples can be classified according to two variant procedures for producing the resin according to the invention. In one case, the manufacture of resins takes place by adding the amine under heating; in the other case, the amine is added to the cooled reaction mixture.

In both cases, the first condensation phase between the phenol and the formaldehyde takes place in the following manner:

Formaldehyde and phenol are placed in a reaction vessel. Next, while stirring mechanically, the mixture is heated or cooled until a temperature slightly higher than the phenol-melting temperature is reached. Mechanical stirring continues for the entire reactive cycle. The catalyst is added steadily, then, immediately after the end of this addition operation, the temperature of the mixture is raised until it reaches a value allowing optimal condensation and the production of a dilutable resin. This temperature is maintained until the phenol-conversion rate is greater than or equal to 93%.

Next, in one case, the mixture is gradually cooled by adding amine while stirring; in the other case, it is gradually cooled until a temperature of between 45° C. and 20° C. is reached, and then the amine is added.

Examples 1 and 2 pertain to the production of resins by adding amine during the cooling phase.

EXAMPLE 1 a) Preparation of the resin

In a 2-liter reaction vessel equipped with a stirring mechanism, a condenser, a thermometer, and a reagent feed, 546.66 g of phenol (6 moles) are added to 1,217.43 g of 37% aqueous formaldehyde solution (15 moles), thus giving an F/P mol ratio of 2.5.

The mixture is heated to 45° C. while stirring, next, 56.47 g of a 50% aqueous sodium hydroxide solution (i.e., 11 moles OH$^-$ per 100 moles of original phenol) is steadily added over 30 minutes, while maintaining a temperature of 45° C.

The temperature is then steadily raised from 45° to 70° C. over 30 minutes and is kept at 70° C. for 80 minutes, until the phenol-conversion rate reaches 93%.

Next, the mixture is steadily cooled. For the first 30 minutes, 141.16 g (or 25% of the weight of the phenol) diethanolamine is gradually added. After addition of the amine, the temperature is approximately 60° C. During the 15 minutes following the addition of the amine, since the reaction is exothermic, the temperature of the reactive mixture is kept at 60° C. Next, the cooling of the mixture continues. When the temperature of the mixture reaches approximately 25° C., after about 30 min, a 20% sulfuric acid solution is added over 60 minutes, so as to produce a pH of 8.0-8.1. Then, 426.5 g of urea in granular form (or 35% of the total weight of the resin expressed as dry matter) are added gradually over a period of 60 minutes.

The resin exists as a clear aqueous compound and has an infinite dilutability in water at 20° C. after more than 8 days. The free phenol percentage is 0.8%, and the free formaldehyde percentage is less than 0.5%.

It may be noted that, if this resin is compared with a resin obtained according to the procedure described in U.S. Pat. Nos. 4,663,419 and 4,710,406, for example the resin in Example 4, these two resins have slightly different free phenol percentages (0.5% and 0.8%). This difference is due to the fact that, in one case (that of the present invention), the F/P ratio is 2.5, and, in the other case (that of U.S. Pat. Nos. 4,663,419 and 4,710,406), the F/P ratio is 3.5. The free formaldehyde percentage of the resin in Example 4 U.S. Pat. Nos. 4,663,419 and 4,710,406 is 1.12%, and the dilutability is 2,000% after more than 8 days.

b) Sizing Composition

The resin of Example 1a is used to prepare a sizing composition without adding urea. The sizing additives are ammonium sulfate and liquid ammonia.

Of 100 parts resin by weight, the ammonium sulfate accounts for 2 parts and the liquid ammonia, 1 part.

c) Preparation of Sized Mineral Fibers

At the outlet of an apparatus for the manufacture of mineral fibers using a conventional centrifugal stretching operation, the sizing composition of Example 1b is sprayed at the rate of 2-20% sizing composition by weight in relation to the weight of the finished insulating product on the fibers between the time they leave the centrifugal device and their arrival at the collection mechanism. The water contained in the compound partially evaporates because of the high temperature. After the fibers are collected on the collection device and a layer is formed, the fibers are subjected to a thermal treatment in the oven at a temperature of between 180° C. and 200° C. for about 2 minutes, thereby leading to the polycondensation of the resin.

When used for the production of sized mineral fibers, the sizing composition containing the resin according to the invention and formed from phenol-formaldehyde, formaldehyde-urea, and phenol-formaldehyde-amine condensates is exposed to temperatures higher than 100° C. Because the urea-formaldehyde condensate is relatively unstable under heat, it tends to decompose, thus reforming formaldehyde.

To assess the pollution resulting from the free formaldehyde, which can be released during the treatment of the mineral fibers by the sizing composition, a method is employed which simulates the conditions to which the sizing composition is exposed.

Method for Evaluating the Formaldehyde Emissions 100 g of the sizing composition of Example 1b containing 10% dry matter are placed in an oven at 180° C. for 2 hours, and air is swept across it at the rate of 1 liter per minute. The vapors released are fed into three bubble chamber containing water, and the formaldehyde is determined by spectrocolorimetry (chromotropic acid method) and the phenol, by chromatography in the gaseous phase, by means of an apparatus equipped with a flame-ionization detector. A reference solution is used for the phenol determination.

The quantity of formaldehyde released is 2.5 g, and that of the free phenol, 8.8.g, per kilogram of dry matter of a 10% sizing composition.

In comparison, for a standard sizing composition (which will be specified below), the respective quantities of formaldehyde and phenol released under the same conditions are 6 and 11 g.

EXAMPLE 2

In this example, 1,003.15 g of a 37% formaldehyde solution (12.4 moles) are reacted with 377.6 g of phenol (4 moles). Lime (CaO) is used as a catalyst in amount of 20.8 g (0.316 mole). During the cooling phase, 75.52 g of monoethanolamine (20% of the weight of the phenol) are added.

The quantity of urea added after neutralization with sulfuric acid to obtain a pH of 8.2 corresponds to 35% of the total weight of the resin expressed as dry matter.

The resin obtained has an infinite dilutability in water, a free phenol content of less than 0.2%, and a free phenol content of less than 0.5%.

The following example pertains to a resin prepared by adding amine when cooled.

EXAMPLE 3 a) Preparation of the Resin

In a similarly-equipped reaction vessel, 470.55 g of phenol (5 moles) are added to 1,420.34 g of a 37% aqueous formaldehyde solution, thus giving an F/P mol ratio of 3.5. As in Example 1, the mixture is heated to around 45° C.; next, over a 30-minute period, 47.06 g of a 50% aqueous sodium hydroxide solution (or 0.588 mole and 11.76 moles of $OH^-$ for 100 moles of the original phenol) are added while maintaining the temperature at 45° C. The mixture is heated to 70° C. over 30 minutes and then kept at that temperature for approximately 90 min, until a phenol-conversion rate of 97.5% is obtained. The mixture is then gradually cooled to 25° C. over 50 min. Next, 38.76 g of monoethanolamine, a quantity corresponding to 8.2% of the total weight of the phenol, are added; this addition takes place gradually over 20 min. The reaction mixture is neutralized using a 20% sulfuric acid solution until a pH of 7.4 is obtained. Next, a 27% liquid ammonia solution in a quantity corresponding to 20% of the stoichiometry of the formaldehyde-liquid ammonia reaction is added at 20° C. over approximately 30 min.

Next, over a 60-minute period, 471.2 g of urea in granular form in a quantity corresponding to 35% of the total weight of the resin expressed as dry matter are added.

The resin appears as a clear aqueous compound having infinite dilutability in water at 20° C. after more than 8 days. The free phenol content is less than 0.2%, and the free formaldehyde content, less than 0.75%.

b) Sizing Composition

As in Example 1, a sizing composition is prepared containing only the resin of Example 3a and, as bonding additives, 6 parts ammonium sulfate and 3 parts liquid ammonia.

The thermal stability of the sizing composition is evaluated as specified in Example 1.

The quantity of formaldehyde regenerated during the test is 3 g, that of the phenol, 6 g per kilogram of dry matter of the 10% sizing composition.

EXAMPLE 4

A resin is prepared as described in Example 1 using formaldehyde and phenol, so as to obtain an F/P mole ratio of 2.3. The reaction between the formaldehyde and the phenol takes place at 70° C. for 90 min. Diethanolamine is added in the proportion of 22% of the weight of the phenol beginning at the start of the cooling of the reaction mixture, as indicated in Example 1. No urea is added after neutralization with sulfuric acid.

The resin thus obtained has a free phenol percentage of 1.3% and a free formaldehyde content of less than 0.5%. The free phenol percentage, which is higher than in the other examples, results from the low F/P ratio. On the other hand, since no urea has been added, the resin contains no urea-formaldehyde condensate and is thus more stable. Urea may be added to the sizing composition containing this resin, in order to adjust the gel time of the composition.

The following part of the description pertains to applications of bonded mineral fibers according to the invention.

The mineral fibers bonded by means of a sizing composition according to the present invention can be used, in particular, for insulating products, but also used to make soilless cultivation substrates.

The advantages linked to the use of sizing compositions according to the present invention in these two application will be indicated in the comparative examples below of five compositions $A_1$, $A_2$, $B_1$, $B_2$, and C.

The compositions $A_1$ and $A_2$ are standard compounds, as previously mentioned. Both contain a resin based solely on formaldehyde and phenol in an F/P mol ratio of between 2.7 and 4.2, and preferably between 3.0 and 3.5, as well as the conventional sizing additives specified above, i.e., urea, sulfate, ammonium sulfate, silane, liquid ammonia, and, potentially, a mineral oil. Thus, no urea is added during the resin-manufacturing cycle, but is added only during the final formulation of the sizing composition.

Compounds $B_1$ and $B_2$ are according to the present invention. They contain a resin whose composition is identical to that indicated in Example 1 above and which has an F/P ratio of 2.5 but a slightly different proportion of urea, counted for 20 parts of dry matter of the sizing composition, while the complete resin numbers 100 parts for $B_1$ and 35 for $B_2$. They also contain additives similar to the ones indicated above, but, in this instance, no additional urea.

Compound C also conforms to the invention and is, in all respects, similar to compound $B_1$. Only the F/P ratio is changed, here being 2.

The proportions of each of the constituents of the sizing compositions are indicated as parts of dry matter of the sizing compositions:

|  | resin (not including urea) | urea | oil | sulfate | silane | liquid ammonia |
|---|---|---|---|---|---|---|
| Comparative Examples |  |  |  |  |  |  |
| $A_1$ | 70 | 30 | 0 | 1 | 0.1 | 6 |
| $A_2$ | 55 | 45 | 9.5 | 3 | 0.3 | 6 |
| Present Invention |  |  |  |  |  |  |
| $B_1$ | 80 | 20 | 0 | 1 | 0.1 | 6 |
| $B_2$ | 65 | 35 | 9.5 | 3 | 0.3 | 0 |
| C | 80 | 20 | 0 | 1 | 0.1 | 6 |

Whether for producing insulating boards or cultivation substrates, comparisons were made of the rates of phenol and formaldehyde release on a fiber-drawing production line on which glass fibers were centrifuged and stretched, when sizing compositions $A_2$ and $B_2$ were sprayed between the fiber-drawing mechanism (centrifuge) and the receiving device (conveyor belt). These measurements were effected at the fiber-collection apparatus, which is normally equipped with suction means allowing a more effective collection of the fibers. It was in the gas flows created by these suction currents that evaluations were made of the quantities of phenol and formaldehyde, expressed as kilograms per ton of glass fiber:

|  | phenol | formaldehyde |
| --- | --- | --- |
| $A_2$ | 0.36 | 1.70 |
| $B_2$ | 0.17 | 0.17 |

The proportions of the sizing compositions $A_2$ and $B_2$ in relation to the quantity of the impregnated glass were identical (approximately 4.5%, i.e., a normal percentage for insulating products). This result demonstrates, therefore, that the use of a sizing composition $B_2$ according to the present invention, rather than a standard sizing composition $A_2$, makes possible a substantial reduction of the phenol percentages (by 53%) and especially of the formaldehyde percentages (by 85%) released on the fiber-drawing line at the spot most likely to induce these releases.

Using a sizing composition containing a resin according to the present invention which has an F/P mol ratio of 2.5, phenol and formaldehyde release rates on the bonded glass-fiber production line of 0.17 g per ton of glass are thus achieved.

The formaldehyde content released by soilless substrates based on bonded glass and rock fibers was also assessed under conditions of use, i.e., when the fibers are impregnated with water which irrigates the plants and feeds them the substances necessary for growth.

The method used to simulate these conditions should first be specified: it consisted in taking samples measuring $75 \times 70 \times 40$ mm$^3$ (210 ml) from the final substrate, the mass proportion of the sizing composition in relation to the fibers being, in this instance, 2.5%, the normal percentage for the soilless cultivation products. These samples were then soaked in a parallel piped-shaped plastic box in 250 ml of demineralized water. (The dimensions of the box were such that the sample was completely saturated with water.)

It should be noted that the soaking conditions and time were chosen so as to correspond as much as possible to the conditions of a standard cultivation cake saturated in its plastic sheath on which a pepper plant is placed after three days of soaking.

After three days of contact with the "box closed," the entire quantity of solution (demineralized water and possible formaldehyde) was recollected using pressure and filtration. Next, the quantity of formaldehyde that has passed into the water solution was measured using chromotropic acid and expressed in milligrams of formaldehyde per liter of aqueous solution.

The results of the comparative tests using three sizing compositions $A_1$, $B_1$ and C were classified in the following table:

| tests | formaldehyde (rock fibers) | formaldehyde (glass fibers) |
| --- | --- | --- |
| $A_1$ | 1.36 | 0.98 |
| $B_1$ | 0.35 | 0.53 |
| C | — | 0.58 |

In a completely unexpected manner, it was discovered that the sizing compositions according to the invention $B_1$ and $C_1$ released much less formaldehyde in water than the standard sizing composition $A_1$, this reduction being more than 41% in the case of glass fibers and at least 74% in the case of rock fibers.

Now, it appears to have been proven that an excessively-high quantity of formaldehyde made soluble in irrigation water can produce effects harmful to plant growth. Special advantage is therefore gained by proposing the sizing compositions according to the present invention, which are much less likely than others to release formaldehyde through hydrolysis in an aqueous medium.

For informational purposes, it should thus be indicated that a sizing composition containing a resin according to the present invention which has an F/P ratio of 2.5 makes it possible to achieve formaldehyde-release rates for glass-fiber and rock-fiber cultivation substrates of 0.35 mg/l and 0.53 mg/l of immersion water, respectively, i.e., rates which are all less than 0.60 mg/l.

It is further specified that, while all of the resins according to the invention can profitably be used in sizing compositions for insulating or soilless cultivation products, it seems preferable to avoid catalyzing the polymerization of the resin by means of barium oxide, which may ultimately prove toxic for the plants.

Obviously, numerous modifications and variations of the present invention are possible in light of the above teachings. It is therefore to be understood that within the scope of the appended claims, the invention may be practiced otherwise than as specifically described herein.

What is claimed:

1. A liquid resin comprising phenol-formaldehyde, urea-formaldehyde and phenol-formaldehyde-amine condensates having a free formaldehyde content of less than or equal to 3%, of the total fluid weight and a dilutability in water of at least 1000% at 20° C., obtained by the steps comprising:
   i) reacting phenol and formaldehyde to form a phenol-formaldehyde condensate;
   ii) cooling the reaction mixture; and
   iii) reacting the excess formaldehyde with urea;
   wherein said resin further contains an phenol-formaldehyde-amine condensate obtained by adding 5 to 40% by weight of an amine, based on phenol, to the cooled reaction mixture or during said cooling of said reaction mixture; and
   said phenol-formaldehyde-amine condensate is formed before reacting the excess formaldehyde with urea.

2. The liquid resin according to claim 1, wherein the amine is an alkanolamine.

3. The liquid resin according to claim 2, wherein the amine is selected from the group consisting of monoethanolamine and diethanolamine or a mixture thereof.

4. The liquid resin according to any one of claims 2, 3 or 1, wherein said resin has a free formaldehyde content of less than 0.75%, a free phenol content of less than 0.2%, and infinite dilutability at 20° C.

5. The liquid resin according to any one of claims 2, 3 or 1, wherein said resin has a free phenol content of less than 0.2%, a free formaldehyde content of less than 0.5%, and infinite dilutability in water at 20° C.

6. The liquid resin of claim 1, wherein at least 93% of the starting phenol is converted to phenol-formaldehyde.

7. A process for the preparation of a liquid resin comprising phenol-formaldehyde, urea-formaldehyde and phenol-formaldehyde-amine condensates comprising:
   i) reacting phenol and formaldehyde in a phenol-formaldehyde mol ratio greater than 1 in the presence of a basic catalyst to form a phenol-formaldehyde condensate;
   ii) cooling the reaction mixture; and
   iii) reacting the excess formaldehyde with urea;
wherein, before adding urea, 5 to 40% by weight of an amine, based on phenol, is added to the cooled reaction mixture or during said cooling of said reaction mixture to form a formaldehyde-phenol-amine condensate.

8. The process according to claim 7, wherein phenol and formaldehyde are reacted in a mol ration of between 1.8 and 5.

9. The process according to either of claims 8 or 7, wherein phenol and formaldehyde are reacted in the presence of a basic catalyst in a quantity corresponding to from 6 to 20 hydroxyl $OH^-$ mole equivalents for 100 moles of original phenol, at a temperature of between 60° C. and 75° C. until a phenol-conversion rate equal to or greater than 93% is achieved.

10. The process of claim 9, wherein said phenol and said formaldehyde are reacted at a temperature of approximately 70° C.

11. The process according to either of claim 8 or 7, wherein the amine is an alkanolamine.

12. The process according to claim 11, wherein the alkanolamine is selected from the group consisting of monoethanolamine and diethanolamine or a mixture thereof.

13. The process according to either of claims 8 or 7, wherein the amine is added gradually during cooling of the reaction mixture.

14. The process according to either of claims 8 or 7, wherein the reaction mixture is cooled to a temperature of between 45° C. and 20° C., and the amine is then added gradually to the cooled reaction mixture.

15. The process according to either of claims 8 or 7, wherein the basic catalyst is selected from the group consisting of calcium oxide, sodium hydroxide, potassium hydroxide, calcium hydroxide, barium hydroxide, and triethylamine.

16. The process according to either of claims 8 or 7, wherein the addition of urea is begun when the reaction mixture has reached a temperature of approximately 25° C.

17. The process according to claim 17, wherein the quantity of urea added accounts for from 10% to 50% of the total weight of the resin expressed as a dry matter.

18. The process according to either of claims 8 or 7, wherein liquid ammonia is added in a quantity representing from 0 to 100% of the stoichiometry of the formaldehyde-liquid ammonia reaction and before adding the urea.

19. The process according to either of claims 8 or 7, wherein the reaction mixture is neutralized before the addition of urea by means of addition of an acid selected from the group consisting of sulfuric acid, sulfamic acid, phosphoric acid, and boric acid or a mixture thereof.

* * * * *